June 23, 1964 J. J. LENTZ ETAL 3,138,784

SUPERCONDUCTOR GUARD STRIP GATING DEVICE

Filed April 29, 1959 4 Sheets-Sheet 1

INVENTORS
JOHN J. LENTZ
DAVID J. DUMIN

BY John E. Dougherty Jr.
ATTORNEY

United States Patent Office 3,138,784
Patented June 23, 1964

3,138,784

SUPERCONDUCTOR GUARD STRIP GATING DEVICE

John J. Lentz, Chappaqua, and David J. Dumin, Poughkeepsie, N.Y., assignors to International Business Machines Corporation, New York, N.Y., a corporation of New York Filed Apr. 29, 1959, Ser. No. 809,818
5 Claims. (Cl. 340—173.1)

The present invention relates to superconductor gating and switching devices and circuits using such devices and, more particularly, to novel and improved superconductor devices of the type including superconductor gate elements and superconductor control elements, as well as to circuits using devices of this type.

Though the phenomenon of superconductivity has been known for some 50 years and a great deal of experimental research has been conducted to investigate various aspects of this phenomenon, it has been only in recent years that the efforts to use this phenomenon in electrical circuits have become significant. Some examples of relatively early circuit developments in this field may be found in U.S. Patent Nos. 2,189,122; 2,522,153; and 2,533,908, issued to D. H. Andrews; Patent Nos. 2,666,884 and 2,725,474, issued to E. A. Ericson et al.; and Patent No. 2,704,431, issued to F. G. Steel. Still more recently, as is evidenced by Patent No. 2,832,897, to D. A. Buck and copending applications, Serial No. 615,814, filed on October 15, 1956; Serial No. 625,512, filed on November 30, 1956; and Serial No. 761,085, filed on September 15, 1958, in behalf of R. L. Garwin and assigned to the assignee of the subject application, a number of superconductor switching devices and circuits have been proposed which have particular application in the computer and information handling fields. Generally speaking, these devices each include a control element and a gate element which are fabricated using either conventional wire or thin evaporated films. Thin film type gating devices are advantageous in that they exhibit a high resistance when in a normal state and may be fabricated economically using vacuum evaporation techniques. Devices of this type are most conveniently vacuum deposited on planar substrates and the film conductors, so deposited, are themselves essentially planar, and are so termed even though deviations from actual planar configurations result when a number of conductive and insulating layers are evaporated one on top of the other. One basic distinction between devices of the wire and thin film types stems from the difference in cross sectional geometry of these two types of conductors. The cross section of a wire conductor is, of course, circular whereas that of the thin film conductors is rectangular, with the evaporated films having a width which is very much greater than their thickness. When a current is applied to either type conductor, when in a superconductive state, the current flows in a thin shell adjacent the surface of the conductor. With wire conductors, any such current is uniformly distributed in this shell whereas, with a thin film conductor of rectangular cross section, the current distribution is non-uniform with a large part of the current being concentrated at the edges of the conductor. As a result of the uniformity of current distribution in the wire conductors, the current which such a conductor is capable of carrying and still remain in a superconductive state is about what would be expected from the Silsbee hypothesis; whereas, with the thin film type conductors of rectangular cross section, it has been found that, due to the non-uniformity of current distribution, the maximum current which such conductors can carry and still remain superconductive is much less than would be predicted by the Silsbee hypothesis.

One way of achieving a more uniform current distribution in thin film conductors of rectangular cross section is shown in the above cited copending application, Serial No. 625,512, wherein the conductors forming the gate and control elements are mounted on a superconductive shield. A further structure, which realizes the high resistance advantages inherent in extremely thin films and, at the same time, achieves uniform current and field distribution is shown in the above cited copending application, Serial No. 761,085, wherein the characteristics of hollow cylindrical conductors arranged one within the other, as well as planar counterparts of this type of structure, are employed to advantage. In each of the devices described above, the gate element is driven resistive by the field applied by the control conductor. Further, in all of the structures of the prior art, direction sensitivity, that is, the ability of the devices to respond differently to currents flowing in different directions, has been achieved with the use of a third element in the form of a bias conductor. This direction sensitivity is important in circuits wherein persistent currents in opposite directions are stored in superconductor loops with the direction of the current indicating the value of the current stored in the circuit.

In accordance with the principles of the subject invention, a new and improved superconductor device is provided which, like previous devices, includes a gate element and a control element but, unlike previous elements, employs the control element, which is termed a guard strip, to alter the Silsbee current of the gate element, which is termed a gate strip. The device is fabricated by arranging the gate and control strips one above the other extending longitudinally in the same direction. With this arrangement, it has been found that the guard strip, even though it is narrower than the gate strip, serves a function similar to that of a superconductive shield in that it increases the Silsbee current of the gate strip by a factor of almost two. Further, by varying the current through the guard strip, both in direction and magnitude, the Silsbee current for the gate strip can be varied about this increased value. Thus, for example, it is possible to increase the Silsbee current of the gate strip by applying a current in one direction to the guard strip and decrease the Silsbee current of the gate strip by applying a current in the opposite direction to the guard strip.

One advantage which is realizable with this new and improved device is that, when a current is applied to the gate strip, which, for the current then being applied to the guard strip, causes the Silsbee current of the gate strip to be exceeded, the entire gate strip goes resistive all at once. Since the speed of many superconductor circuits is dependent upon the L/R time constant of the gating devices used, the novel guard strip gating device, which provides a large amount of resistance while exhibiting a low inductance, makes possible extremely high speed switching of current between parallel paths in superconductor circuits. Since the device is direction sensitive and also sensitive to very small changes of current in the guard strip, it is used to advantage in a current measuring and testing apparatus, as well as a means for detecting the decay of a persistent current stored in a closed superconductive loop. The guard strip device is also used to advantage as a sensing device in combination with superconductive loops wherein persistent currents in opposite direction, representative of different information values, are selectively stored.

Therefore, it is an object of the present invention to provide an improved superconductor gating device.

A further object is to provide a device of the above described type exhibiting a high resistance and a low inductance.

Another object is to provide a two element unbiased superconductor gating device which is sensitive to the direction of applied current signals.

A further object is to provide a novel superconductor gating device, as well as circuits using this device, wherein very small current signals having a brief duration may be employed to switch a current back and forth between two parallel superconductive paths.

A further object of the present invention is to provide a superconductor device of the type having a control element and a gate element, wherein the control element by its presence alone, greatly increases the value of current which the gate element can carry and still remain in a superconductive state and, further, a device of this type wherein this increased value of current which the gate element can carry and still remain superconductive may be varied by applying a current to the control element, with the response of the device being dependent not only upon the magnitude of current applied but also upon its direction.

A further object is to provide improved superconductor current detecting and measuring circuits.

Another object is to provide improved persistent current storage circuits.

Still another object is to provide a superconductor persistent current storage circuit employing a guard strip device for detecting the magnitude and/or direction of persistent current stored in a superconductive loop, and/or changes in the magnitude and/or direction of a stored persistent current.

A further object is to provide improved superconductor circuits, and specifically, circuits of the type employing devices including a gate element and a control element, wherein a current signal applied to the control element does not affect the state of the gate element unless a current signal is also applied to the gate element.

These and other objects of the invention will be pointed out in the following description and claims and illustrated in the accompanying drawings, which disclose, by way of examples, the principle of the invention and the best mode, which has been contemplated, of applying that principle.

Figure 1:
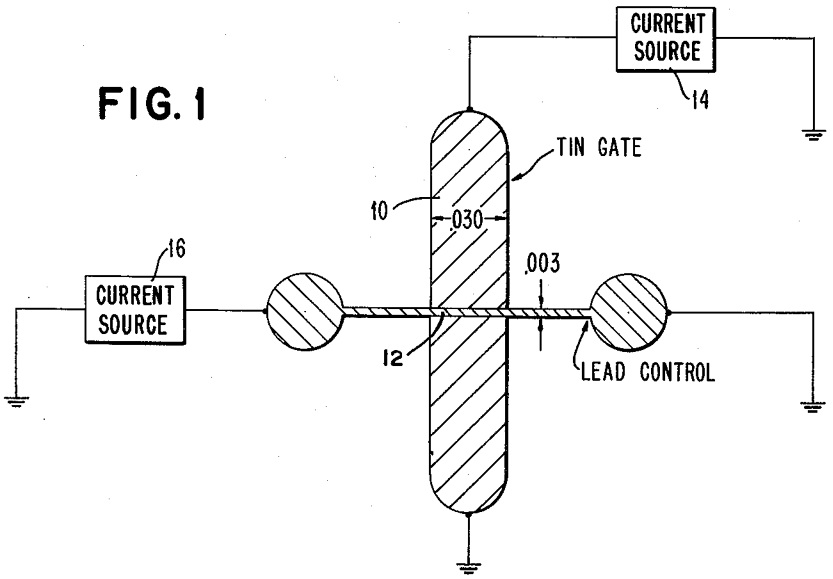
FIG. 1 is a diagrammatic representation of a thin film cryotron of the type shown and described in copending application, Serial No. 625,512.

FIG. 1 is a schematic representation of a thin film cryotron of the type shown and described in copending application, Serial No. 625,512, filed November 30, 1956, in behalf of R. L. Garwin and assigned to the assignee of the subject application. In this figure, 10 designates a cryotron gate element and 12 a cryotron control element. The control element 12 is made narrower than the gate at the point at which it extends across the gate so that the device will exhibit gain; that is, to allow a current of a first magnitude in the gate element 10 to be controlled by a current of a lesser magnitude in the control element 12. These currents are, in the diagram of FIG. 1, supplied to the gate and control elements both by sources 14 and 16, respectively. Two cryotron devices of this type may be connected with their gates in parallel to form a bistable circuit and, since the devices may be fabricated to exhibit gain, one such bistable circuit may be used to control a similar bistable circuit. In such circuits, the limiting factor, as far as speed of operation is concerned, is the L/R time constant of the circuit, that is, the time required to shift current from one side of the parallel circuit to the other. When using thin film cryotrons of the prior art type, as shown in FIG. 1, the control is effective to apply magnetic fields to only the portion of the gate directly below it, and it is only this portion of the gate, which itself exhibits a relatively small resistance that is controlled directly by the field of the control element. Due to heating effects, the resistance in the gate may be found to spread along the length of the gate after the portion immediately beneath the control element is driven resistive. However, this spreading of the resistance takes time and is dependent upon a number of factors including the thermal properties the gate, itself, as well as of the substrate and insulating material which are usually used in fabricating the device. In order to increase the resistance which is introduced in the gate element under the direct control of the field applied by the control element, cryotron devices may be fabricated with the control element arranged to pass back and forth across the gate a number of times. However, while this type of arrangement does increase the resistance introduced as a direct result of the applied control field, it not only complicates the structure but also increases the inductance of the control element. A further characteristic of cryotron elements of this type is that they are insensitive to the direction of current in the control and gate and, further, it has been found that, when such devices are fabricated without using hard superconductive shields, the Silsbee current of the gate, that is the current which the gate itself can carry without being driven resistive by its self current, is lowered when the control element is placed across the gate.

Figure 2:
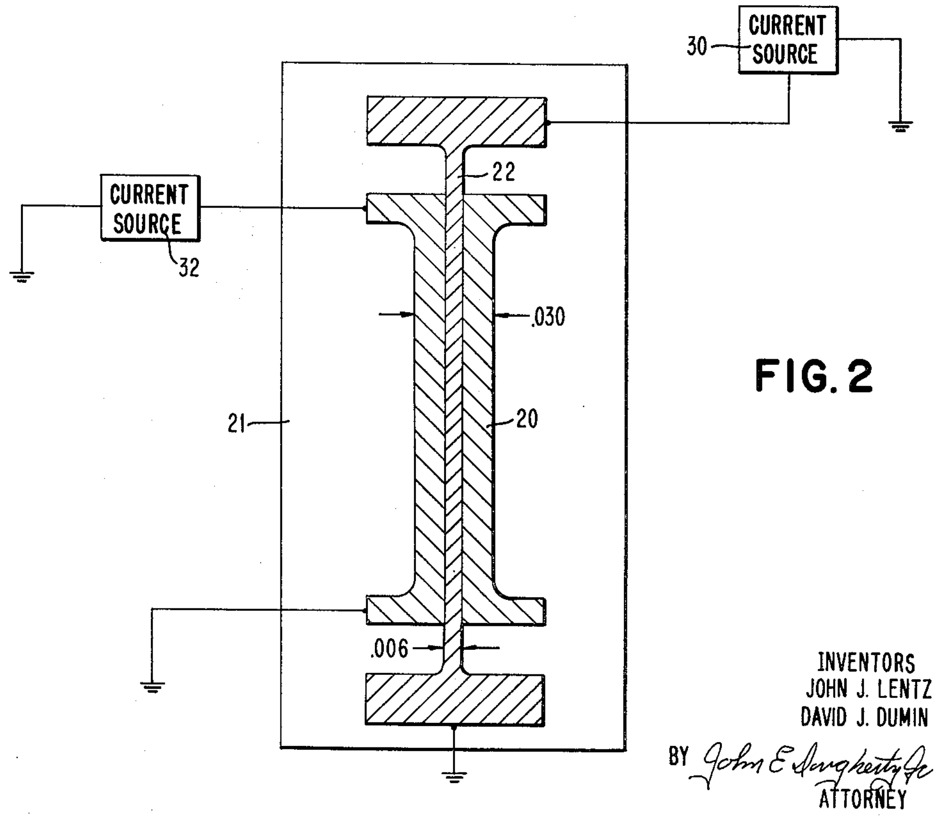
FIG. 2 is a diagrammatic representation of a guard strip device constructed in accordance with the principles of the subject invention.

FIG. 2 shows a cryotron gate device constructed in accordance with the principles of the subject invention. This device includes a gate element 20 and a control element 22, which are laid down, using, for example, evaporating techniques, on a planar substrate 21 with a layer of insulating material between the elements. Control element 22 is narrower than the gate and is arranged with its longitudinal axis parallel to the axis of the gate. The principle of operation of this device is different from that of conventional cryotrons and the difference in principle of operation may be stated thusly. In conventional cryotrons as exemplified by the device of FIG. 1, the gate element is selectively driven resistive by the field applied by the control elements; whereas, in the novel structure of FIG. 2, the field produced by current in the control element alters the Silsbee current for the gate, that is, the maximum current which the gate can carry without driving itself resistive. The control element 22 has been termed a guard strip and, using this nomenclature, the structure of FIG. 2 may be described as a switching or gating device in which the Silsbee current of the gate 20 is altered under the control of a control current in the guard strip 22.

The actual principles underlining the achievement of this type of control may be best understood by a consideration of FIGS. 2A, 2B, 3 and 4. In the latter figure, the resistance of a gate is plotted against the current carried by the gate and, therefore, the plot shows the Silsbee current characteristic for the gate. The gate is, of course, maintained at a temperature below that at which the superconductive material of which it is fabricated undergoes transitions between superconductive and resistive states in the absence of a magnetic field. If, for example, the gate is fabricated of tin, the operating temperature would be below 3.73° K., which is the transition temperature for this particular material. At this temperature, the gate is, of course, superconductive when carrying no current and remains superconductive as long as the current through the gate is kept below a predetermined characteristic minimum which is designated $I_1$ in FIG. 4. When this current value in the gate is exceeded, the gate begins to exhibit resistance. The actual transition of the gate from a completely superconductive to a completely resistive state is rather abrupt, but as indicated in the plot, the transition curve has a "toe" which shows that the gate resistance initially increases slightly as the value $I_1$ is exceeded until the point is reached at which the gate is abruptly driven completely resistive.

Figure 3:
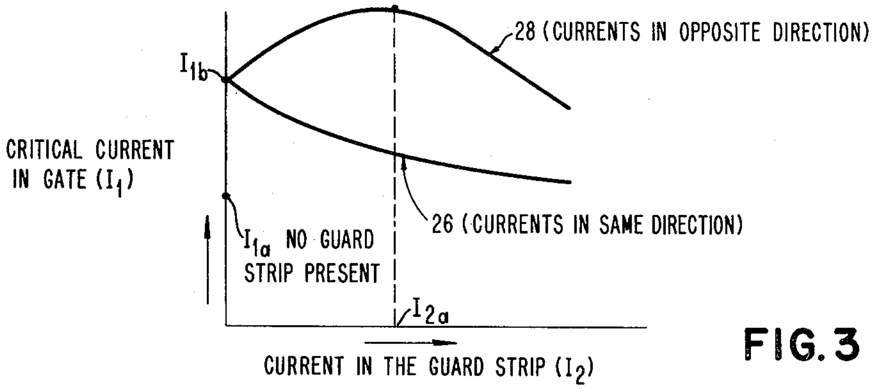
FIG. 3 is a plot exhibiting the manner in which the current in the guard strip of the device of FIG. 2 may be employed to alter the Silsbee current of the gate strip of this device.
Figure 4:
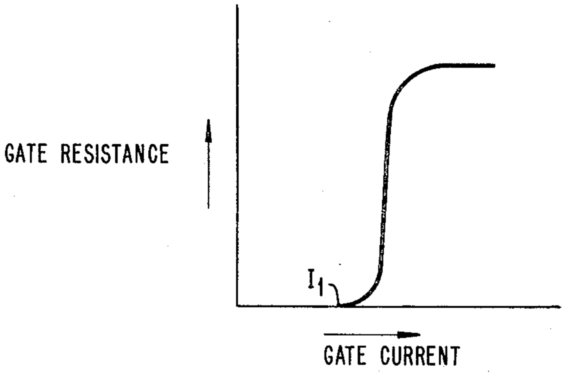
FIG. 4 is a plot exhibiting the Silsbee current characteristic for a conductor of superconductive material.

FIG. 3 illustrates the manner in which the Silsbee current characteristic of a gate may be controlled with a guard strip using a construction such as is shown in FIG. 2. This figure represents the characteristic for a tin gate and a lead guard strip with the Silsbee current for the gate ($I_1$) being the ordinate in the plot and the current in the guard strip ($I_2$) the abscissa. The first thing that should be noted in the plot is that by merely placing the guard strip adjacent the gate, as shown in FIG. 2, the Silsbee current $I_1$ for the gate is increased by a factor of almost two. The Silsbee current for the gate, in the absence of the guard strip, is represented at $I_{1a}$ and, in the presence of the guard strip, at $I_{1b}$. There are two curves shown in FIG. 3. The first of these curves, which is designated 26, represents the relationship between the Silsbee current for the gate and the current in the guard strip when the current in these two elements is in the same direction. The other curve, designated 28, represents the same characteristic when the current in the guard strip is in a direction opposite to that of the current in the gate. It is apparent from curve 26 that, when the guard strip current and the gate strip current are in the same direction, the Silsbee current for the gate is lowered by the presence of the current in the guard strip. However, as is demonstrated by curve 28, when the currents in the two elements are in opposite directions, and the guard strip current is increased from zero to a value $I_{2a}$, the Silsbee current of the gate is actually increased. Any increase of the current in the guard strip above this value causes the Silsbee current for the gate to begin to decrease. From this plot, it can be seen that if, for example, in the device of FIG. 2, a current source 30 applies to guard strip 22 a current equal to the value $I_{2a}$, and a current source 32 applies a current equal to the value $I_{1b}$ in the opposite direction to gate 20, the gate will remain in a superconductive state. However, if the currents supplied by source 30 is interrupted or reversed, gate 20 will exhibit resistance.

Figure 2A:
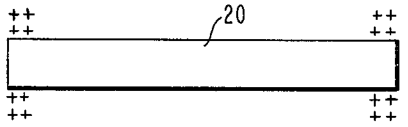
FIG. 2A is a diagrammatic representation indicating the manner in which the magnetic field is distributed around a current carrying thin film conductor in the absence of a guard strip or shield.
Figure 2B:
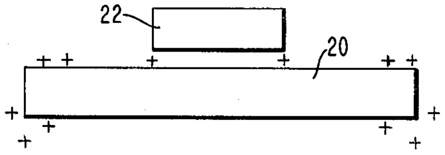
FIG. 2B is a diagrammatic representation indicating the manner in which the magnetic field is distributed around a current carrying thin film conductor in the presence of a guard strip.

In order to properly indicate what is believed to be the reason for this type of behavior and to clearly illustrate the difference in principle between thin film devices of this type and the conventional wire wound structures of the type shown and described, for example, in Patent No. 2,832,897, issued April 29, 1958, to D. A. Buck, reference is made to FIGS. 2A and 2B. These figures indicate the magnetic field distribution around a thin film gate both in the presence of and in the absence of a guard strip with the small + signs indicating the intensity of the magnetic field. The actual thickness of the gate is greatly exaggerated in each of the figures, the actual gate thickness being less than 10,000 Angstroms. With extremely thin films of this type, the current does not flow uniformly through the cross section of the element but flows mostly along the outer surface and particularly at the edges of the element. As a result, the gate field intensity, even for relatively small currents, is very high at the edge of such films as is indicated in FIG. 2A. It is for this reason that the Silsbee current characteristics for thin films of this type are usually much less than the Silsbee hypothesis would lead one to expect. However, when guard strip 22 is placed adjacent the gate 20, as is shown in FIG. 2B, both current in the gate and the field produced by this current, as is indicated in FIG. 2B, are more uniformly distributed. The field produced by the gate current is now less intense at the edges of the gate and more intense in the space between the gate and guard strip than was the case before the guard strip was added. As a result of this more uniform field distribution, the current, which the gate can carry without driving itself resistive, is increased. Further, as indicated in FIG. 3, the magnitude of the effect can be controlled by passing current through the guard strip. It should thus be apparent that, in the device of FIG. 3, it is actually the Silsbee current of the gate which is controlled by the presence of current in the guard strip. Particular note should be made of the fact that the guard strip, besides providing this control, also actually doubles the Silsbee current of the gate merely by its presence next to the gate.

One important characteristic of the gating device of FIG. 2 is that, when the current supplied by source 32 to guard strip 22 is such as to allow the gate to be driven resistive by the current supplied to the gate by source 30, the entire length of the gate is driven resistive. Further, the large resistance is achieved, while at the same time lowering the inductance of the guard strip since with the two elements arranged to extend in parallel spaced relationship, as shown, each element lowers the inductance of the other element.

Another characteristic of the guard strip device of FIG. 2 is its extreme sensitivity, and it should be noted that this sensitivity is realized in a two element device without the necessity of employing a separate bias conductor. Thus, for example, it can be seen that, if a current, slightly less than the value $I_{1b}$ of FIG. 3, is applied by source 30 to gate 20, the gate remains in a superconductive state in the absence of current supplied to guard strip 22 by source 32. If, however, a very small current is applied by source 32 to guard strip 22 in the same direction as a current in the gate 20, the Silsbee current of the gate is lowered so that the entire gate is immediately driven resistive. Since only a small amount of current is required in the guard strip to thus alter the resistance of the gate and, as indicated in FIGS. 2A and 2B, even in the presence of the guard strip 22, the field produced by current in the gate is still most intense along the edges of the gate, it is possible, for many applications, to fabricate the guard strip 22 of the same material as the gate 20 and still have the gate be controlled between resistive and superconductive states by the guard strip while the guard strip itself always remains superconductive. In such cases, both gate 20 and guard strip 22 might be fabricated of tin. However, care must be taken in designing the geometry of such devices since, even though the guard strip carries only a small current relative to that carried by the gate, the Silsbee current varies with the size of the conductors and, therefore, the Silsbee current of the narrower guard strip is less than that of the wider gate.

The above mentioned extreme sensitivity of the guard strip of FIG. 2 may be employed in many current measuring applications. An example of such an application is shown in the embodiment of FIG. 5. In this figure, the guard strip device is schematically represented in order to more clearly show circuit connections; the gate for the device being designated 20*a* and the control or guard strip, which is shown arranged next to the gate instead of above it, is designated 22*a*. The guard strip 22*a* is connected in one side of a parallel circuit which extends between a pair of terminals 40 and 42, to the former of which is connected a current supply source 44. The gate 20a of the guard strip device is connected in an output or sense circuit and receives its current from a current source 46. A voltmeter 48 is connected across the gate 20a in order to provide indications of its state. Guard strip 22a is connected in one path 48 of the parallel circuit which extends between terminals 40 and 42. Path 48 includes a gate of the cryotron 52, as well as the guard strip 22a. The other path 50 includes the gate of a cryotron 54, as well as a superconductive circuit to be tested, which is presented by a block designated 56. Cryotrons 52 and 54 as shown using the conventional wire wound representation in the interest of clarity of illustration, it being, of course, understood that thin film type cryotrons, for example, of the type shown in FIG. 1, would be employed in the circuit.

The first step in the operation of the circuit of FIG. 5 is to calibrate the guard strip device formed by the gate 20a and guard strip 22a. This is accomplished by energizing the coil of cryotron 54 so that the gate of this cryotron is resistive, and then supplying a known current in a known direction to guard strip 22a. Source 46 is then actuated to supply a current to gate 20a, and the current supplied by this source is increased until gate 20a is driven resistive, which state is indicated by voltmeter 48. This procedure is repeated a number of times at varying currents in both directions applied by source 44 to guard strip 22a until curves similar to those shown in FIG. 3 have been obtained. The value $I_{1b}$ is, of course, obtained by applying current to gate 20a with no current in guard strip 22a. Once the device has been calibrated, the circuitry within the block represented at 56 may be tested. Such a test becomes important when the circuit represented within the block includes one or more connections between the superconductive components, or is a thin film circuit laid down by a vacuum deposition process, since, in fabricating such circuits, there is always a possibility that one of the connections or film strips is not completely superconductive but exhibits a very low resistance that it is very difficult to detect.

The first step in testing the circuitry represented by block 56 is to allow the gate of cryotron 54 to become superconductive and energize the control conductor of cryotron 52 so that the gate of the latter cryotron is driven resistive. A known current is then supplied at terminal 40 by source 44. As the gate of cryotron 52 is superconductive, this current is directed through path 50. When the current has been established in path 50, current source 46 may be actuated to provide a check reading of the Silsbee current of gate 28. This reading will correspond essentially to the value $I_{1b}$, assuming that, if there is any resistance in the circuit being tested, it is extremely small compared to the resistance of gate 52. In any event, the Silsbee current for gate 20a is again measured and thereafter the control conductor of cryotron 52 is deenergized and the gate of this cryotron becomes superconductive. If path 50, including the circuit to be tested as represented by block 56, is entirely superconductive, the entire current from source 44 will remain in this path. However, if the circuit under test exhibits even a slight resistance, the current will begin to shift from path 50 to path 48 at a rate which is determined by the L/R time constant of the circuit. In order to detect any such current shift, current source 46 is actuated at predetermined intervals after gate 52 is allowed to go superconductive. If, after a period of time, the Silsbee current for gate 20a remains the same as it was initially, that is, prior to the deenergization of the control of cryotron 52, it can be concluded that the circuitry under test is completely superconductive. If, however, a current shift is occurring even at an extremely slow rate, the presence of even a very small current in guard strip 22a will alter the Silsbee current of gate 20a and any such change will be sensed when the source 46 is actuated to apply a gradually increasing current to gate 20a. Since the direction of the current supplied by source 44 is known and the curves similar to those shown in FIG. 3 have been calibrated, the actual amount of current which has been shifted from path 50 to path 48 can be easily obtained from any new value of Silsbee current for gate 20a. Further, by accurately timing the deenergization of cryotron 52, and the subsequent tests of gate 20a for changes in the Silsbee current, the actual time required for any current shift, as well as the magnitude of the current shifted, can be obtained. With these factors, and knowing the inductance of the circuit, it is possible to calibrate the resistance in the circuit under test. In some superconductive circuitry it is, of course, necessary that there be no resistance, though in some applications it is entirely possible that superconductive circuits may be usable wherein a slight amount of resistance is included within the circuit. For example, cross coupled cryotron circuits of the type shown in the above mentioned Patent No. 2,832,897, may be fabricated and operated successfully even though some of the connections between the various components are not entirely superconductive.

In actual operation of guard strip devices, it has been found that, when the devices are supplied with a current sufficient to cause them to be driven resistive, some $I^2R$ heating results and this heating limits the repetition rate at which such devices may be used. In some cases, it was also observed that once the Silsbee current of the gate has been exceeded for a particular value of guard strip current and the gate, therefore, is driven resistive, the heat developed is such that the gate remains resistive even after the guard strip current is removed and, in fact, until a significant portion of the current in the gate itself is removed. The amount of this type of heating and its effect are dependent upon a number of factors, among which are size of the current applied to the gate strip, and the thermal time constant of the substrate on which the device is laid down, as well as that of the insulating material employed in fabricating the device.

Figure 5A:
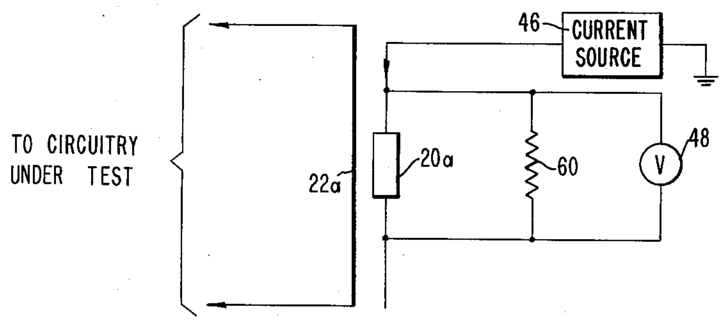
FIG. 5A is a diagrammatic representation of an alternate form of a portion of the circuit of FIG. 5.
Figure 5:
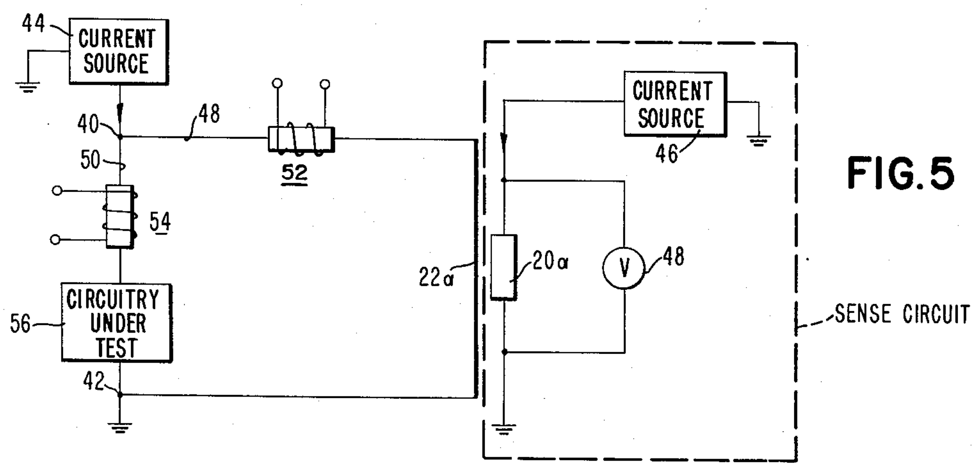
FIG. 5 is a diagrammatic representation of a current measuring and testing circuit constructed in accordance with the principles of the subject invention.

FIG. 5A shows an embodiment of the invention wherein a copper conductor 60 is connected in parallel with gate 20a. Only a portion of the circuit is shown in FIG. 5 since, in all other respects, the circuit of this figure corresponds to the circuit of FIG. 5. The copper element 60 exhibits resistance under all conditions of circuit operation but the actual resistance of the element is relatively small. When a gradual rising current is supplied to the gate 20a by source 46, the entire current will be directed through this gate as long as it remains in a superconductive state. When the supply current reaches a value such that the Silsbee current for the gate is exceeded, the actual value depending upon the current carried by guard strip 20a, the gate is driven resistive, which condition is immediately sensed by voltmeter 48. The parallel connected resistive element 60 provides a path to which current in gate 20a from source 46 can be shifted, thereby lessening the amount of heat generated by the guard strip device.

Figure 6:
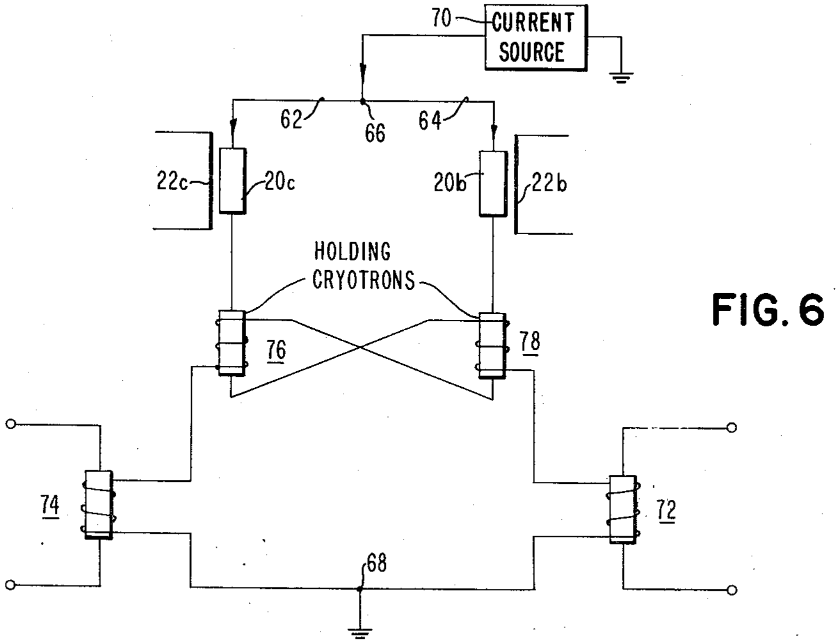
FIG. 6 is a circuit diagram of a bistable circuit employing guard strip devices to control the switching of the circuit between its stable states.

Guard strip devices of the type shown in FIG. 2 may be also employed in bistable superconductor circuits, in which case the high sensitivity of the device allows the provision of circuits which may be switched between their two stable states in response to extremely small signals. Further, as a result of the relatively high resistance provided by such devices when switched, extremely high speed current switching may be realized. An example of such a circuit is shown in the embodiment of FIG. 6. This circuit includes two parallel paths 62 and 64 extending between a pair of terminals 66 and 68. Current is supplied to the circuit by a current source 70 which is connected to terminal 66. The circuit is considered to be in its first stable state when the entire current supplied by source 70 is in path 62, and in its second stable state when this current is in the other path 64. The circuit is switched back and forth between its stable states under the control of a pair of guard strip devices one of which has its gate, designated 20c, connected in the path 62, and the other of which has its gate, designated 20b, connected in path 64. The output for the circuit is provided by a pair of cryotrons 72 and 74, the former of which has its control conductor connected to path 72 and the latter has its control conductor connected in path 74. Therefore, the gate of cryotron 72 is resistive when the circuit is in its first stable state with the current from source 70 directed to path 62, and the gate of cryotron 74 is resistive when the circuit is in its other stable state with the current in path 64. The circuit is also provided with a pair of cross coupled cryotrons 76 and 78, the function of which is to both positively maintain the circuit in either of its stable states after it has been switched under the control of the guard strip devices, and also to aid in the switching of the circuit between its stable states. The gate of cryotron 76 is connected in path 62 and its control conductor in path 64, whereas, the gate of cryotron 78 is connected in path 64 and its control conductor is connected in path 62. Therefore, when the circuit is in its first stable state, with the source current in path 62, the gate of cryotron 78 is maintained resistive and, similarly, when the circuit is in its second stable state, with the source current in path 64, the gate of cryotron 76 is maintained resistive. Cryotrons 72 through 78 are shown using the conventional wire wound representation in the interest of providing a more graphical illustration of the circuit, though, of course, it is understood that thin film devices such as are shown in the above cited copending application, Serial No. 625,512 may, and in all probability, would be employed in most circuit applications.

The operation of the circuit may be explained if we consider that the circuit is initially in its first stable state, with the entire current from source 70 in path 62. The magnitude of the current supplied by this source may be just less than the magnitude $I_{1b}$, shown in FIG. 3, so that each of the gates 20c and 20b is capable, in the absence of a current in its associated guard strip, of carrying this entire current and remaining in a superconductive state. With the current from source 70 in path 62, both of the gates 20c and 20b are superconductive, the gate of cross coupling cryotron 76 is superconductive and that of cross coupling cryotron 78 is resistive; and the gate of output cryotron 72 is resistive and that of output cryotron 74 is superconductive. The circuit may now be switched to its second stable state by applying to guard strip 22c a current in the same direction as the current in the associated gate 20c. Only a relatively small current is required in the guard strip to lower the Silsbee current of gate 20c sufficiently to allow the gate to be driven resistive by the current supplied by source 70. As a result of this gate being driven resistive, current will begin to shift from path 62 to path 64 and, since, as above stated, the gate 20c provides a relatively large resistance, this switching occurs at a relatively high speed. The cross coupling cryotrons 76 and 78 are each designed so that the control conductor for each of these cryotrons requires a current substantially equal to six-tenths of the current supplied by source 70 to drive its associated gate resistive. Thus, it can be seen that it is necessary that gate 20c remain in a resistive state for a sufficient time to switch at least six-tenths of the current from path 62 to path 64. From an examination of FIG. 3 it would appear that, even though the guard strip current is maintained in guard strip 22c, the gate 20c would assume a superconductive state after a small portion of the current is shifted to path 62 from path 64. However, as has been pointed out above, an appreciable amount of $I^2R$ heat is produced by the current in the gate 20c when it is initially driven resistive. This heating is sufficient, in combination with the shifting current in the gate 20c, to maintain this gate resistive until sufficient current has been shifted to path 64 to render the coil of cryotron 76 effective to drive the gate of this cryotron resistive. Since, by this time, the gate of cryotron 78 has assumed a superconductive state, the resistive gate of cryotron 76 causes the current switching to continue until the circuit has assumed its second stable state with all of the current in path 64. The circuit may be switched back to its first stable state by applying to guard strip 22b a current in the same direction as that of the current supplied to gate 20b by source 70.

From the above, it can be seen that, by using the novel guard strip, a bistable circuit is provided, which uses two element devices not requiring separate conductors, and which is capable of being switched back and forth between its stable states at extremely high speeds in response to pulses of brief duration and of a magnitude which may be very small in relationship to the current which is switched. Further, the switching time of the circuit is less than that of similar circuits employing conventional cryotrons. Another feature of the circuit is that it is sensitive to the direction of the signals applied to the input guard strips 22b and 22c. Regardless of which stable state the circuit is in, no switching can be accomplished by current pulses applied to the guard strips, which are in a direction opposite to the direction of current supplied to the gates by source 70.

Figure 7:
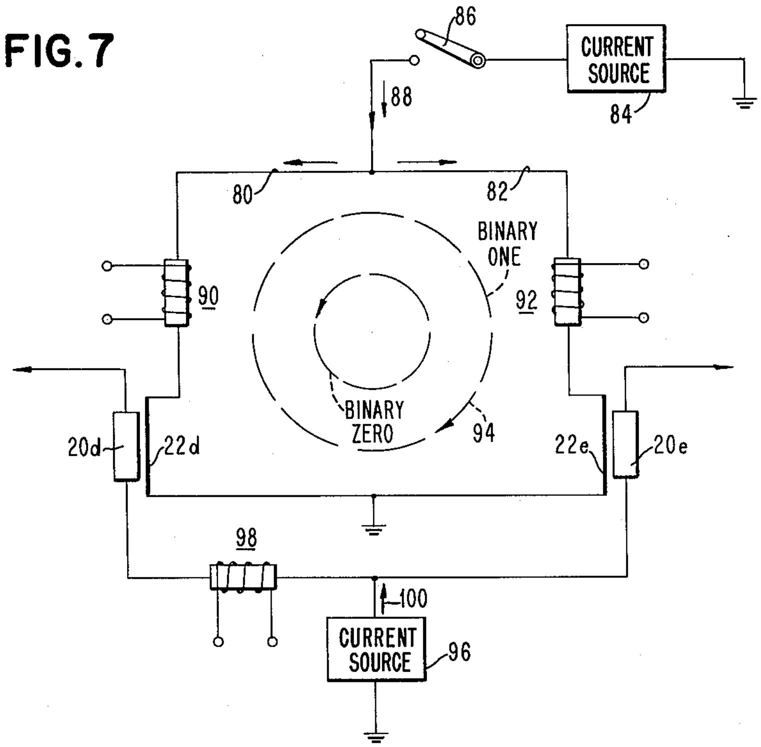
FIGS. 7 and 8 are circuit diagrams of embodiments illustrating persistent current storage loops with guard strip devices employed to sense the persistent current conditions of the loops.

FIG. 7 shows an embodiment of a persistent current storage device which employs a pair of guard strip devices to provide output indications of the information stored. The storage circuit includes a pair of parallel paths 80 and 82 which are connected across a current source 84 that supplies current to the circuit under the control of a switching device, here represented by mechanical switch 86. Source 84, when switch 86 is operated, supplies current in the direction indicated at 88. The gates of a pair of cryotrons 90 and 92 are connected in paths 80 and 82, respectively. The circuit may be caused to assume one stable state, which is here termed the binary one state, by energizing the coil of cryotron 90; then operating switch 86 to allow source 84 to apply current to the circuit, thereafter deenergizing the control conductor of cryotron 90, and finally interrupting the current supplied by source 84 by opening switch 86. When during the above described operation, current is supplied by source 84 with the gate of cryotron 90 resistive, this current is directed entirely to the superconductive path 82. After this current has been established in this path and the gate of cryotron 90 is allowed to become superconductive, no current switching is accomplished since both paths are then completely superconductive. However, when switch 86 is subsequently opened, a persistent current in a clockwise direction, as is indicated at 94, is stored in the closed superconductive loop formed by paths 80 and 82. The magnitude of this persistent current is dependent upon the ratio of the inductances of the two paths 80 and 82. If each of these paths have the same inductance, the magnitude of the persistent current will be essentially equal to one half of the current supplied by source 84. A persistent current in a counterclockwise direction, representative of a binary zero, may be stored in the circuit of FIG. 7 by energizing the control conductor of cryotron 92, operating switch 86, and, thereafter, deenergizing the control conductor of cryotron 92 and opening switch 86 in that order. It should be noted that, whenever the coils of cryotrons 90 and 92 are energized, they introduce resistance into a portion of the loop and therefore extinguish the previously stored persistent current.

The outputs for the circuit are realized with a pair of guard strip devices, one of which has its guard strip 22d connected in path 80, and the other of which has its guard strip 22e connected in path 82. The gates of these devices are designated 20d and 20e, and are connected in parallel across a current source 96. The entire current supplied to the output circuit by source 96 is initially caused to flow through gate 20e by energizing the control conductor of a cryotron 98, which has its gate connected in series with gate 20d. The current supplied by source 96 is in the direction indicated at 100, so that the direction of the current in the gate 20e is opposite to that of the current in its guard strip 22$e$ when the circuit of FIG. 7 is storing a clockwise persistent current representative of a binary one. When there is a counterclockwise current representative of a binary zero stored in this loop, the current in guard strip 22$e$ is in the same direction as that supplied by source 96 to gate 20$e$. The current supplied by source 96 is just less than the current value $I_{1b}$ (FIG. 3). From this figure it can be seen that the Silsbee current of gate 20$e$, with respect to the current supplied by source 96, is lower when the circuit is storing a binary zero than when the circuit is storing a binary one. The magnitudes of the information representing persistent currents stored in the superconductive loop of FIG. 7 are such that the Silsbee current of gate 20$e$ is less than the current supplied by source 96 when the circuit is storing a binary zero, but is greater than the current supplied by this source when the circuit is storing a binary one. Conversely, the Silsbee current for the gate 20$d$ is less than the magnitude of the current supplied by source 96 when the circuit is storing a binary one and is greater than this current when the circuit is storing a binary zero.

As was stated above, the current in source 96 is initially directed through gate 20$e$ by energizing the control conductor of cryotron 98 before any storage operations are begun. If, thereafter, control conductor 98 is deenergized, the current from the source 96 remains in gate 20$e$ since both of the gates 20$e$ and 20$d$ are superconductive as are the paths in which they are connected. Assume now that, with the output circuit in this condition, a binary one is stored in the loop formed by paths 80 and 82 by energizing the control conductor of cryotron 90, closing switch 86, and then deenergizing this control conductor and opening this switch in the manner described above. When the current supplied by source 84 is directed into path 82, this current is in the direction opposite to the current then carried by gate 20$e$ so that the Silsbee current for this gate is actually increased and the gate remains entirely superconductive. When, thereafter, switch 86 is opened after the control conductor for cryotron 90 has been deenergized and a persistent current in the clockwise direction is stored in the loop, the direction of the current in guard strip 22 is still opposite to that in gate 20$e$. Therefore, this gate remains superconductive and the current from source 96 is not shifted.

When, however, a binary zero is stored in the circuit of FIG. 7, the current from source 96 is shifted from gate 20$e$ into gate 20$d$ in the following manner. The first step in the storage of the binary zero is the energization of the control conductor of cryotron 92 to drive the gate of this cryotron resistive, thereby quenching the persistent current then stored in the circuit. Thereafter, switch 86 is closed and the entire current from source 84 is directed through path 80 which includes guard strip 22$d$. This current is in a direction to increase the Silsbee current of gate 20$d$ with respect to the current supplied by source 96. The storage of a binary zero is completed by deenergizing the control conductor for cryotron 92 and opening switch 86. When this switch is opened, a counterclockwise current is stored in the circuit, thereby decreasing the Silsbee current of gate 20$e$ with respect to the current supplied by source 96. Gate 20$e$ which, up to this time, is carrying the entire current from source 96, is driven resistive, and the current from source 96 begins to shift from gate 20$e$ to gate 20$d$. The design of the thermal time constant of the guard strip devices is such that gate 20$e$ remains resistive until essentially all of the current is switched to gate 20$d$. Since the current in guard strip 22$d$ is in an opposite direction to the current in gate 20$d$ with a binary zero stored in the circuit, gate 20$d$ is capable of carrying the entire current from source 96 and remaining in a superconductive state. The current from source 96 remains in gate 20$d$ indicating the storage of a binary zero. When a binary one is to be stored, the control conductor of cryotron 90 and switch 86 are operated, as described above, to cause a clockwise persistent current to be established, thereby causing gate 20$d$ to be driven resistive and the current from source 96 to be shifted back to gate 20$e$.

Figure 8:
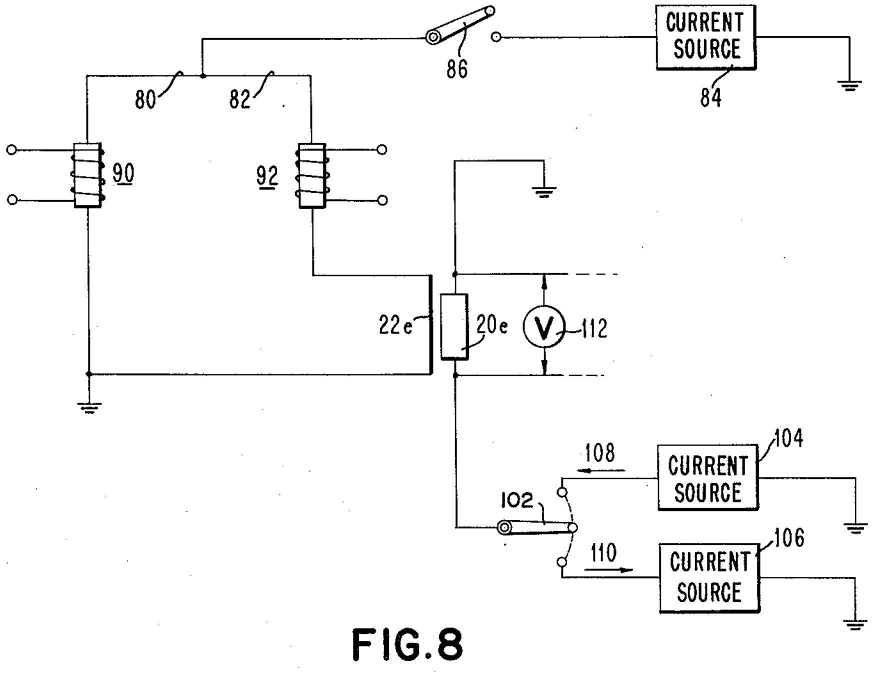

The circuit of FIG. 8 is similar to that of FIG. 7 with the exception that only a single guard strip is provided to sense the state of the circuit. The guard strip device formed by the gate 20$d$ and guard strip 22$d$ has been eliminated from the circuit and the gate 20$e$ of the remaining guard strip device is now connected through a switch 102 to a pair of current sources 104 and 106. Under the control of binary one and binary zero inputs applied to the control conductors of cryotrons 90 and 92, persistent current in clockwise and counterclockwise directions, respectively, are stored in the loop of FIG. 8 in the manner described above with reference to FIG. 7. Current source 104 supplies current in the direction indicated by arrow 108 and current source 106 supplies current in the opposite direction as indicated by arrow 110. This being the case, current source 104 is similar to current source 96 in FIG. 7. When switch 102 is operated to connect this current source to gate 20$e$, the gate is driven resistive when the circuit is storing a binary zero and provides an output indication in the form of voltage which is sensed by voltmeter 112. However, gate 20$e$ remains super-conductive in the presence of current from source 104 when there is no persistent current stored in the loop or when a binary one is stored in the form of a clockwise persistent current. When current source 106 is connected to the circuit by opening switch 102, current in the opposite direction is applied to gate 20$e$. A voltage is then sensed by voltmeter 112 when the circuit is storing a binary one and no voltage is sensed when the circuit is storing a binary zero. The circuit of FIG. 8 may be considered as a comparison circuit wherein a pulse applied by the source 106 represents a binary one and a pulse applied by source 104 represents a binary zero. Gate 20$e$ is driven resistive and an output voltage indication obtained in voltmeter 112, when the binary value stored in the circuit corresponds with the value represented by the current supplied by one or the other of the sources 104 and 106. When the stored value is different than the input or interrogation value, gate 20$e$ remains superconductive. It should also be apparent that, in the circuit of FIG. 8, either one of the sources 104 or 106 may be used to provide outputs at voltmeter 112 indicative of the values stored in the loop formed by paths 80 and 82.

A further utilization which may be made of this circuit is that it provides a means for sensing the decay of the persistent current which has been stored in the loop formed by paths 80 and 82.

Let us assume, for example, that a persistent current in a clockwise direction is stored in this loop and switch 102 is operated to connect current source 104 to gate 20$e$. Let it be further assumed that this source now supplies current in excess of the value $I_{1b}$ (FIG. 3) for the gate 20$e$, but that the gate 20$e$ is capable of carrying this value of current without driving itself resistive as long as a current of sufficient magnitude is flowing in the proper direction in guard strip 22$e$. Thus, gate 20$e$ remains superconductive as long as the magnitude of the persistent current stored in the loop and, thus, flowing in guard strip 22$e$, does not fall below that which is necessary to allow gate 20$e$ to carry the current supplied by source 104 and still remain superconductive. However, if the persistent current in the loop begins to decay, the current supplied by source 104 exceeds the Silsbee current for gate 20$e$ and this gate is, therefore, driven resistive providing a voltage output indication at voltmeter 112.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A superconductor gating device comprising: a planar substrate; a first superconductor strip laid down on said substrate; a second superconductor strip laid down on said substrate; said strips being laid down one above the other extending longitudinally in the same direction on said planar substrate with insulating material therebetween; one of said strips being appreciably narrower than the other of said strips; means maintaining each of said superconductive strips at a temperature at which it is superconductive in the absence of a magnetic field; means connected to said strips for producing current in either the same direction or opposite directions in said strips; whereby said first strip remains superconductive when said currents are applied in opposite directions to both said strips and is driven resistive when the currents applied to said strips are in the same direction.

2. The device of claim 1 wherein said second strip is appreciably narrower than said first strip.

3. In a superconductor device; a planar substrate; a superconductor gate strip laid down on said substrate; a second superconductor strip laid down on said substrate; said strips being arranged one above the other and extending in the same direction on said substrate with insulating material therebetween; said second strip being appreciably narrower than said gate strip; means coupled to said gate strip for producing a current therein; said second strip serving to render the field produced by said current in said gate strip more uniform whereby the Silsbee current of said gate strip is higher in the presence of said second strip than in the absence thereof.

4. In a superconductor circuit; a closed loop of superconductor material; means for storing a persistent current in said loop; and means for sensing a change in the persistent current stored in said loop comprising a guard strip device and a current supply means; said guard strip device including a superconductor gate strip and a superconductor guard strip each maintained at a temperature at which it is superconductive in the absence of a magnetic field; said gate and guard strips being arranged one above the other extending in the same direction; said guard strip being narrower than said gate strip; said guard strip being connected in said superconductive loop; said gate strip being connected to said current supply means.

5. A guard strip device for sensing current in a current path, said guard strip device including a first current supply means, a planar substrate, a guard strip and a gate strip laid down one above the other and extending in the same direction on said planar substrate wherein said guard strip is appreciably narrower than said gate strip, said guard strip being connected in said current path and said gate strip being connected to said first current supply means, means for maintaining said guard strip and said gate strip at a superconducting temperature, a second current supply means connected to said current path for producing current in said current path the magnitude of which is insufficient to cause said gate strip to be driven resistive in the absense of current in said gate strip, whereby said gate strip is only driven resistive where there is current in both said guard strip and said gate strip.

References Cited in the file of this patent

UNITED STATES PATENTS

| | | |
|---|---|---|
| 2,189,122 | Andrews | Feb. 6, 1940 |
| 2,832,897 | Buck | Apr. 29, 1958 |
| 2,930,908 | McKeon | Mar. 29, 1960 |
| 2,944,211 | Richards | July 5, 1960 |
| 2,966,598 | Mackay | Dec. 27, 1960 |
| 2,980,807 | Groetzinger | Apr. 18, 1961 |
| 3,022,468 | Rosenberger | Feb. 20, 1962 |
| 3,061,738 | Wilson | Oct. 30, 1962 |

OTHER REFERENCES

IBM Journal, October 1957, pp. 304–308 (by R. Garwin).

Electrical Manufacturing, February 1958, pp. 78–83 (Bremer).

"The Cryotron—A Superconductive Computer Component" (Buck), Proceedings of the I.R.E., April 1956, pp. 482–493.

"A Magnetically Controlled Gating Element (Buck), Proceedings of the Eastern Joint Computer Conference, December 10–12, 1956, pp. 47–50.

"Trapped Flux Superconducting Memory" (Crowe), IBM Journal, October 1957, pp. 295–302.